Dec. 19, 1939.  F. H. MATHEY  2,183,817
WEIGHING DEVICE
Filed June 9, 1937
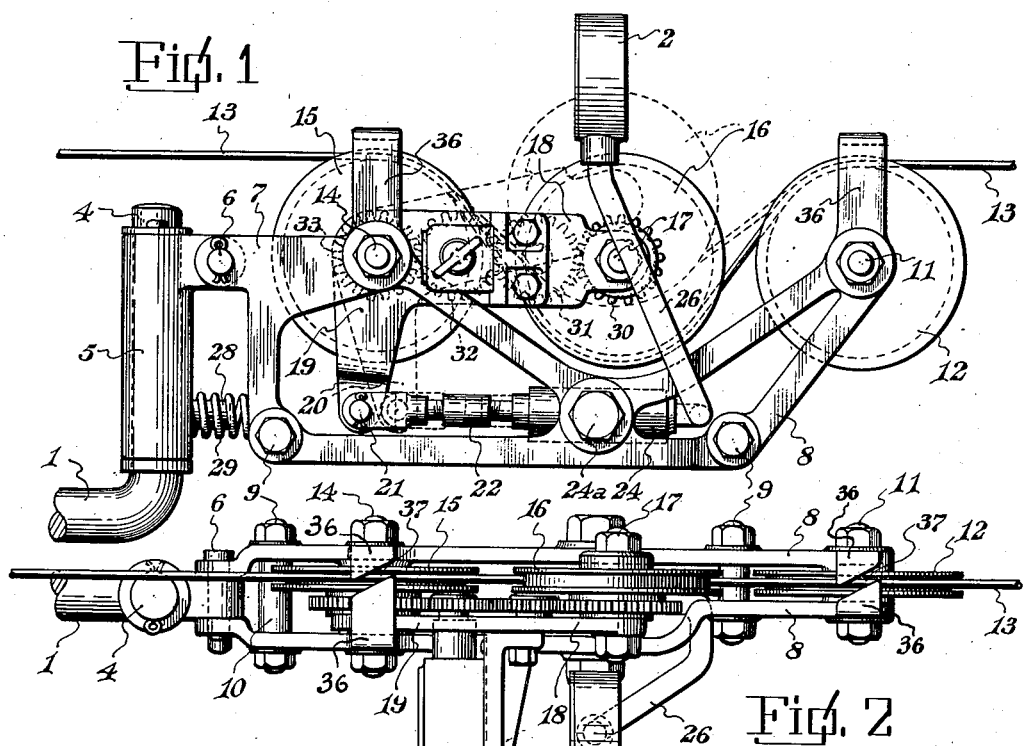
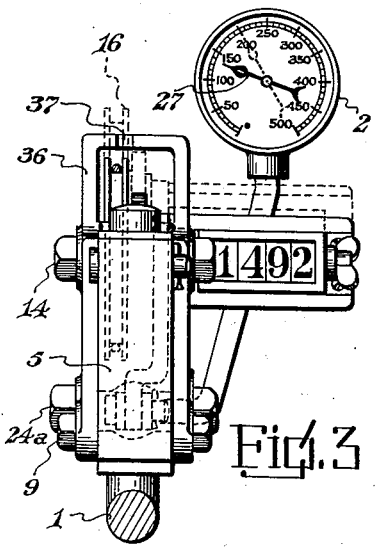
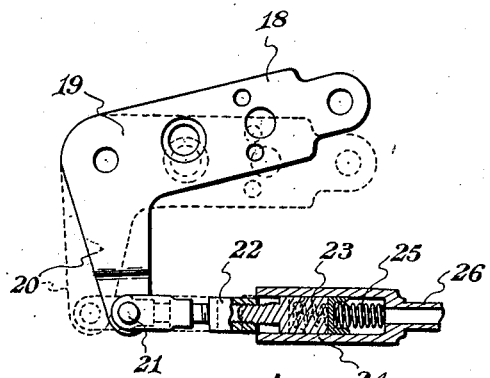
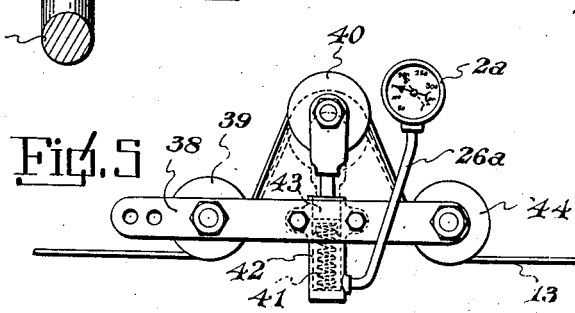
Frank H. Mathey
INVENTOR
BY *Philip A. H. Sewell*
ATTORNEY Patented Dec. 19, 1939

2,183,817

UNITED STATES PATENT OFFICE 2,183,817

WEIGHING DEVICE

Frank H. Mathey, Tulsa, Okla.

Application June 9, 1937, Serial No. 147,370

6 Claims. (Cl. 265—1.6)

The invention relates to combined measuring and weighing devices formed as a single unit, and adapted to be used in connection with apparatus for placing explosive charges in wells, for instance apparatus of the type shown in Reissue Patent #20,191, issued to C. A. Mathey and Paul F. Lewis, December 1, 1936.

A further object is to provide a weighing unit through which the charge lowering wire moves and the unit with indicating means easily observed at the same time by the operator, whereby he can immediately ascertain the time of the obstruction of the dummy on the wire and the depth thereby allowing over-running of the wire, and allowing the final charge to be lowered to the exact depth of the obstruction or point of discharge.

A further object is to provide a weighing unit through which a well wire passes and the unit with means for weighing the wire and indicating when the dummy or trial device reaches the obstruction and simultaneously indicating the particular depth of the obstruction without the necessity of the operator studying indicating means remotely positioned in relation to each other and the consequent inaccurate measurement caused by over running of the wire.

A further object is to provide a weighing meter comprising a frame adapted to be attached to a support, a bell crank lever rockably mounted within the frame and having grooved pulleys on one of its free ends and on its pivotal point geared together for rotation at the same speed and over which pulleys the wire passes from opposite sides whereby the wire is positively driven by both pulleys, thereby preventing slippage of the wire, should it slip on either pulley.

A further object is to provide a fluid cylinder in connection with a fluid gage and having a piston therein controlled by the bell crank lever, and in connection with the gage, forming means for weighing wire, dummy or charge when the dummy or charge reaches the obstruction. This indication being preferably in the form of a fluctuation of the indicator pointer on the fluid pressure gage.

A further object is to pivotally mount the fluid cylinder and to provide an expansion spring within the cylinder and normally forcing the bell crank pulley to a lowered position, which is overcome gradually according to the weight of the dummy and wire or charge and wire.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side elevation of the weighing machine.

Figure 2 is a top plan view of the weighing machine.

Figure 3 is a rear elevation of the weighing machine.

Figure 4 is a detail view showing the bell crank lever in side elevation and the oil cylinder in longitudinal section.

Figure 5 is a side elevation of a modified form of weighing device adapted to be attached to a measuring device having only a depth indicating means in connection therewith, for instance a measure meter shown in Patent #2,060,233, issued November 10, 1936.

The supporting arm 1 supports the weighing machine with its gauge 2 and the arm 1 terminates in a vertically disposed portion 4, on which is pivotally mounted a sleeve 5. Pivotally connected to the upper end of the sleeve 5 at 6, and movable in a vertical plane is a frame 7. Frame 7 is formed from spaced frames 8, which are connected together by bolts 9 extending through sleeves 10. Rotatably mounted on a shaft 11 carried by the forward end of the frame and between the frames 8 is an idle pulley 12, and over the upper side of which pulley the wire 13 extends to the rig and downwardly through the well casing, in the usual manner. Rotatably mounted on the shaft 14, which extends through the frame 8 is a grooved pulley 15, over which the wire 13 extends. The wire 13 then extends downwardly between the grooved pulley 15 and under the pulley 16, and thence over the idler 12. Pulley 16 is rotatably mounted on the shaft 17 carried by the arm 18 of a bell crank lever 19, which is pivoted on the shaft 14 carried by the frame. Bell crank lever 19 rocks upwardly and downwardly in a vertical plane in its stationary frame. The arm 20 of the bell crank lever 19 extends downwardly and has pivotally connected at 21 thereto a forwardly extending adjustable shaft 22, which terminates in a piston 23 slidably mounted in a fluid cylinder 24, and disposed within the cylinder 24 is an expansion spring 25, which normally forces the arm 20 rearwardly and the arm 18 downwardly to the position shown in Figure 1. The cylinder 24 is filled with fluid, preferably oil and has a pipe connection 26 to the weighing indicator or gage 2, and when the dummy reaches the obstruction in the well the hand 27 fluctuates or vibrates, thereby indicating to the operator the obstruction or strata to be blasted has been reached, so the charge can be lowered thereto for a blasting operation.

The fluid gage 2 is of a conventional construction, and as the weight of the wire in the well increases, the grooved pulley 16 moves upwardly gradually incident to increased weight against the action of the spring 25 and the fluid to the position shown in dotted lines in Figure 1. During this upward movement, which is a continuous one, the hand 27 moves evenly and slowly. When the dummy, carried by the wire, reaches an obstruction, for instance fluid or other conditions, the hand 27 will vibrate thereby immediately indicating the point desired without the feeding of additional wire or slack into the well.

The sleeve 5 is preferably provided with a lug 28, and around which lug and interposed between the sleeve and the frame 7, a spring 29 is disposed, which yieldably supports the frame 7 during the operation of the device, thereby taking up the shock of sudden stopping of the wire for a reading operation.

It will be noted that pulleys 15 and 16 are of the same size and that they are positively driven, one from the other, through a gear train formed by gears 30, 31, 32 and 33. Gears 30 and 33 are carried by pulleys 15 and 16 respectively and gears 31 and 32 by the bell crank arm 18, however the gears are of the same size so that the pulleys 15 and 16 will be driven together at the same speed, therefore it will be seen that if there is a tendency of the wire to slip, on either pulley, the other pulley will still be in gripping engagement as far as the wire is concerned until both pulleys again frictionally hold the wire.

Side frames 8 are provided with upwardly and inwardly extending arms 36, terminating in portions overlying the idle pulley 12 and the pulley 15 and which form diagonal slots 37, extending across the pulley tops and through which the wire may be passed to the pulleys when in angular position but can not come off the pulleys after once positioned by a movement in a vertical longitudinal plane. This prevents jumping of the wire from position on the pulleys.

Figure 5 shows a modified form of weighing device adapted to be attached to measure meters now in use for instance of the type shown in Patent No. 2,060,233. The weight indicator is designated at 2a. The device comprises supporting bars 38 adapted to be attached to the measure meter so that the wire 13 can be passed upwardly under a pulley 39 and thence over a pulley 40, yieldably supported on a spring 41 within the fluid cylinder 42 by means of a piston 43, which acts against fluid through the fluid pipe 26a to the weight indicating gage 2a. The wire 13 passes from the pulley 40 under an idle pulley 44 to the well in the usual manner. It will be seen that when the dummy reaches the obstruction the weight indicator or gage 2a will act the same as in the device shown in Figure 1, and as the attachment is applied to a measure meter having only a depth indicating recorder a complete device may be formed having the advantages of both devices.

From the above it will be seen that a weighing meter is provided which is simple in construction, positive in its operation and one wherein an accurate weighing may be obtained as to well conditions at various levels. The dummy used for the first recording is of the same weight as the final charge and its parts, therefore it will be seen that the weighing of the wire parts suspended therefrom will be accurate.

It will be noted that the cylinder 24 is pivotally mounted on the bolt 24a carried by the frame, and that the cylinder entirely supports the indicator 2 as well as the pipe 26. During the operation of the device cylinder 24 may rock as the arm 20 of the bell crank lever moves inwardly or outwardly.

The invention having been set forth what is claimed as new and useful is:

1. A well depth meter for weighing the length of wire paid therethrough, said device comprising a frame, a pivoted bell crank lever within the frame, one arm of said bell crank lever having a pulley mounted therein and movable therewith, a second pulley at the pivotal point of the bell crank lever and over and between which pulleys the wire passes, a fluid wire weighing indicator, said fluid wire weight indicator being controlled through pressure control means connected to the bell crank lever.

2. A device set forth in claim 1 including a gear train connection between the bell crank pulleys whereby said pulleys are rotated at the same speed.

3. A device as set forth in claim 1 wherein the fluid connection from the bell crank lever comprises a hinged piston cylinder, a piston in the cylinder, spring means within the cylinder and normally forcing the piston outwardly and a connecting rod connecting the piston to the bell crank arm.

4. A meter for indicating the weight of wire paid through the meter, said meter comprising a support, a frame carried by said support, a shaft carried by the frame, an idle pulley carried by the outer end of the frame, a bell crank lever rockably mounted on said shaft, spaced pulleys carried by the bell crank lever and shaft, one of said pulleys being disposed on the pivotal point of the bell crank lever and the other pulley carried by one arm thereof and movable therewith, said pulleys being positively driven one from the other at constant speed, said pulleys having grooves in which the wire is disposed, said wire extending over the shaft carried pulley and under the other pulley carried by the bell crank lever and thence over the idle pulley, said bell crank lever being gradually rocked upwardly against fluid pressure as the amount of wire paid through the device increases and a weight indicating gage controlled by the fluid pressure acting against the rocking of the bell crank lever for indicating the weight of wire paid through the device.

5. A meter for indicating the weight of wire paid through the meter, an instrument carried thereby for indicating the weight of the wire paid through the device, the weight indicating means comprising a bell crank lever, a frame in which said lever is mounted, a shaft carried by said frame, pulleys carried by the bell crank lever and the shaft and over, between and under which the wire extends in a position whereby as the weight of wire paid increases the bell crank lever will be rocked upwardly, and a pump connection between the bell crank lever and the weight indicating instrument for indicating the increasing weight of the wire as the bell crank lever is rocked.

6. A measuring meter for indicating the weight of wire paid through the same, said meter comprising a frame, a shaft carried by the frame, a bell crank lever rockably mounted on said shaft, yieldable means against which the bell crank lever rocks and positively geared pulleys carried by the bell crank lever and shaft and over and between which the wire extends.

FRANK H. MATHEY.